United States Patent [19]

Ruffner et al.

[11] Patent Number: 4,600,761

[45] Date of Patent: Jul. 15, 1986

[54] ACRYLIC EMULSION COPOLYMERS FOR THICKENING AQUEOUS SYSTEMS AND COPOLYMERIZABLE SURFACTANT MONOMERS FOR USE THEREIN

[75] Inventors: Charles G. Ruffner; John M. Wilkerson, III, both of Hamilton County, Tenn.

[73] Assignee: Alco Chemical Corporation, Chattanooga, Tenn.

[21] Appl. No.: 782,571

[22] Filed: Oct. 1, 1985

Related U.S. Application Data

[63] Continuation-in-part of Ser. No. 719,768, Apr. 4, 1985.

[51] Int. Cl.[4] ............................................. C08F 216/14
[52] U.S. Cl. ..................................... 526/270; 526/301; 524/555; 524/549; 549/476
[58] Field of Search ................... 526/270, 301, 302; 524/555

[56] References Cited

U.S. PATENT DOCUMENTS

| | | |
|---|---|---|
| 2,718,516 | 9/1955 | Bortnick . |
| 4,233,425 | 11/1980 | Tefertiller et al. . |
| 4,351,754 | 9/1982 | Dupre . |
| 4,384,096 | 5/1983 | Sonnabend . |
| 4,421,902 | 12/1983 | Chang et al. . |
| 4,507,188 | 3/1985 | Chu ................................ 204/159.23 |
| 4,514,552 | 4/1985 | Shay et al. . |

OTHER PUBLICATIONS

Specialty Chemicals Developmental Products Technical Data-Developmental Monomer XAS-10743.00 Isocyanatoethyl Methacrylate, The Dow Chemical Co. (1983).

IEM Isocyanatoethyl Methacrylate A New Difunctional Monomer–Properties, Applications, and Safe Handling, The Dow Chemical Co. (1984).

Paul E. Cranley "Isocyanatoethyl Methacrylate: A Latent Crosslinker for Coating and Adhesive Resins:, The Dow Chemical Co. (1983).

IEM Dual Functional Monomer, The Dow Chemical Co. (1983).

Research Disclosure 20816 (Aug. 1981).

*Primary Examiner*—Paul R. Michl
*Attorney, Agent, or Firm*—Howson and Howson

[57] ABSTRACT

Acrylic emulsion copolymers are prepared by emulsion polymerization of (A) a surfactant monomer, (B) an $\alpha,\beta$-ethylenically unsaturated carboxylic acid monomer, (C) a nonionic $\alpha,\beta$-ethylenically unsaturated monomer and (D) optionally a polyethylenically unsaturated cross-linking monomer. The surfactant monomer is prepared by condensing a polyhydric alcohol or primary amine-containing nonionic surfactant with a monoethylenically unsaturated monoisocyanate. At a low pH the copolymer may be in the form of an aqueous dispersion or latex, but thickens upon neutralization of at least some of the carboxyl groups.

26 Claims, No Drawings

ACRYLIC EMULSION COPOLYMERS FOR THICKENING AQUEOUS SYSTEMS AND COPOLYMERIZABLE SURFACTANT MONOMERS FOR USE THEREIN

BACKGROUND OF THE INVENTION

This application is a continuation-in-part of Ser. No. 719,768 filed Apr. 4, 1985.

Alkali soluble and alkali swellable emulsion polymers and copolymers are well known (see e.g. U.S. Pat. Nos. 3,003,987; 3,070,561, and 3,081,198) and are useful in coatings, textile sizings, textile printing pastes, paints and industrial coatings where a water soluble resin can be utilized. They are also useful as thickening agents in latex based adhesives, where clays, other fillers, pigments and the like are present. In addition, alkali soluble emulsion polymers and copolymers find application in cleaners, laundry detergents, lotions, toothpastes, and other personal care products. In petroleum exploration, acrylic polymers are used as drilling fluid additives for viscosity control and as bentonite extenders for enhancing performance of the drilling fluid. Thus, according to U.S. Pat. No. 4,301,016 water soluble alkali metal polyacrylates are useful additives in drilling fluids based on fresh water.

A variety of natural and synthetic products based on cellulose, starches and proteins also have found application in paints, drilling fluids, paper coatings, adhesives, cleaners, lotions and the like. For instance, U.S. Pat. No. 3,769,247 discloses the use of certain cellulose ethers as thickeners for latex paints. Although acrylic polymer emulsions offer various advantages in most of the above-described areas of use, they have been found to be seriously deficient in some areas, particularly in water-base paint formulations where rheology control is essential to obtain correct flow and leveling, and to minimize splattering and dripping from brushes and rollers. In such paint formulations cellulose-based thickeners generally have out-performed acrylics.

In drilling muds acrylics have performed well in fresh water drilling, U.S. Pat. No. 4,301,016, supra, and U.S. Pat. No. 2,718,497, but acrylics have poor salt tolerance as compared to some cellulosic materials. On the other hand acrylics and other synthetic polymers and copolymers offer a major advantage in manufacturing reproducability, as compared to chemically grafted or modified natural products, provided the salt tolerance problem is not a factor.

The resistance of acrylic polymers to biological decay is a property which is especially beneficial in drilling muds, paints, cleaner solutions, and personal care products. In order to provide improved properties for specific applications, functional polymeric side chains have been added to synthetic acrylic systems.

In various industrial applications, acrylics available as liquid emulsions and dispersions are generally easier to use than modified natural polymers which usually are dry powders, since the former are capable of addition at most any point in a mixing process. On the other hand, dry products based on starches, cellulose, and proteins require a relatively long hydration time and take longer to dissolve than the soluble alkali metal polymers.

Another class of acrylic based emulsion polymers, popularly known as "inverse emulsions" and "inverse suspensions", such as those disclosed in U.S. Pat. Nos. 3,284,393, 3,826,771, are commercially available. These products generally rely on an organic solvent system, typically aliphatic in nature, as the continuous phase, and the presence of large quantities of surfactants. Those formulations which have greater tolerance for salt usually contain major amounts of acrylamide in the copolymers, and minor amounts of other monomers. Unfortunately, acrylamide presents a health hazard in manufacture and use of the copolymers, as well as environmental problems. The difficulty of disposal of the solvents and large amounts of free surfactants in the inverse emulsions has emphasized the need for their replacement by compositions that do not cause environmental pollution. This is especially true as regards drilling fluids where soil polution is a problem, and in the drying of coatings and adhesives where solvent evaporation contributes to air pollution.

U.S. Pat. Nos. 3,657,175 discloses improved thickening agents based on acrylics, styrene and butadiene, containing bound surfactant groups.

As shown by U.S. Pat. Nos. 4,384,096; 4,351,754, and 4,421,903, improved thickeners for aqueous systems have been developed in which there are introduced to the acrylic polymer backbones ester surfactant groups in sufficient number to enhance thickening and rheological properties. These thickeners find use in paints, coatings, adhesives, clearners, drilling fluids, textile printing inks, personal care products, and the like. Difficulties encountered in preparation of such copolymers are poor yield, inadvertant prepolymerzation, dimerization of acrylic acid monomers and the requirement of heat and vacuum conditions if complete conversion is desired. These process steps are costly to carry out, and invariably quantities of esterification catalyst and unreacted nonionic surfactant remain in the product.

In preparing the product of U.S. Pat. No. 4,421,902 a statistical mixture of acrylic acid dimer is obtained prior to esterification which interferes with yield of the desired copolymer having surfactant groups. In addition, the polymerization reaction not being quantitative, produces varying results which is undesirable in commercial practice.

A particular shortcoming of thickeners having an acrylic polymer or copolymer backbone into which are incorporated ester surfactant groups, is the tendency for the ester groups to hydrolize, especially in the presence of highly alkaline compounds, such as sodium hydroxide, whereby the thickening properties of the copolymers is substantially diminished. Thus, such acrylic copolymers do not lend themselves as effective thickeners for aqueous systems containing excess alkali.

U.S. Pat. No. 4,514,552 discloses alkali-soluble thickeners for latex paints which are emulsion copolymers of an alpha, beta-monoethylenically unsaturated carboxylic acid, a monoethylenically unsaturated monomer lacking surfactant capacity, a nonionic urethane monomer which is a urethane reaction product of a fatty alcohol or an alkyl phenol with a monoethylenically unsaturated monoisocyanate, and a polyethlenically unsaturated monomer which may be copolymerized with the copolymer. These thickeners are said to provide superior thickening action and superior hydrolytic stability as compared to the thickeners containing ester groups.

SUMMARY OF THE INVENTION

According to this invention, new anionic copolymers are prepared by emulsion copolymerizing (A) an addition copolymerizable nonionic urethane monomer which is the urethane reaction product of a monoethylenically unsaturated monoisocyanate with a polyhydric alcohol or amine-containing nonionic surfactant of the formula

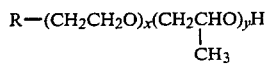

where R, x and y are as indicated hereinbelow (B) an α,β-ethylenically unsaturated carboxylic acid monomer, (C) a nonionic α,β-ethylenically unsaturated monomer, and (D) optionally a small amount of a polyethylenically unsaturated cross-linking monomer. The emulsion polymerization is carried out at a low pH and the resulting copolymers are essentially water insoluble and are present in the aqueous reaction medium in the form of a relatively stable dispersion. Upon addition of an alkaline material to the dispersion to neutralize the residual carboxyl groups on the copolymer, it becomes water soluble and substantially thickens the aqueous system in which it is present. The presence of the copolymerizable nonionic urethane monomer imparts to the copolymer the ability to provide higher water viscosities upon neuteralization, as well as enhanced electrolyte stability. This latter property is most important to the stability of the rheological properties of thickened aqueous systems of very high alkalinity. As noted above, where the surfactant monomer contains ester linkages, hydrolysis of such linkages is known to take place in the presence of highly alkaline compounds, resulting in instability of systems thickened with copolymers based on ester surfactant monomers. The copolymerizable surfactant monomer can easily be prepared in near quantitative yield without unwanted side reactions or formation of by-products which would interfere with production of a commercial product of uniform composition and properties. The reaction employed in preparing the surfactant monomer is general for preparation of all such monomers, and allows the tailoring of copolymers for specific markets.

This invention also contemplates novel addition copolymerizable polyhydric alcohol or amine-substituted carboxyl amino alkyl acrylate surfactant monomers for use in preparing such anionic copolymers.

The new copolymer thickeners are obtained by emulsion polymerizing a monomer system comprising:

(A) about 1 to about 25 percent of at least one nonionic urethane monomer which is the urethane reaction product of a monoethylenically unsaturated monoisocyanate with a nonionic surfactant of the formula:

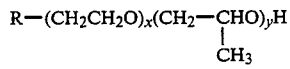

in which x is an integer of from 1 to 150 and y is an integer of from 0 to 40 when R is a sorbitan fatty ester of the formula

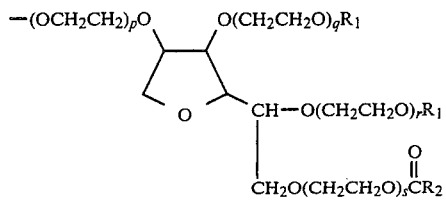

where each of p, q, r and s is an integer and the sum of said integers is from 0 to 100, $R_1$ is H or $-COR_2$, and $R_2$ is alkyl, alkylphenyl, or dialkylphenyl having 5 to 30 carbon atoms; or x and y are each integers of from 0 to 40 when R is $-NH(CH_2)_3O-R_3$, or

where $R_2$ is H or $R_3$, and $R_3$ is alkyl, alkylphenyl, or dialkylphenyl of from 5 to 30 carbon atoms;

(B) about 5 to about 70 percent of a copolymerizable α,β-ethylenically unsaturated carboxylic acid monomer of the formula

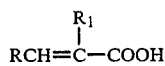

where R is H and $R_1$ is H, an alkyl group containing from 1 to 4 carbon atoms, or $-CH_2COOX$; R is $-COOX$ and $R_1$ is H, and X is H or an alkyl group containing from 1 to 4 carbon atoms, (C) about 10 to to about 90 percent of at least one nonionic, copolymerizable α,β-ethylenically unsaturated monomer of the formula

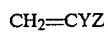

where Y is H and Z is CN, .CL, $-COOR$, $-C_6H_4R$,

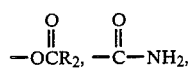

or $-CH=CH_2$; Y and Z are CL, and Y is $CH_3$ and Z is CN,

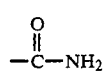

$-CH=CH_2$, $-C_6H_4R$, or $-COOR_1$, and R and H, CL, Br or alkyl containing from 1 to 4 carbon atoms; $R_1$ is alkyl containing from 1 to 12 carbon atoms, or hydroxyalkyl containing from 2 to 8 carbon atoms, and $R_2$ is alkyl containing from 1 to 8 carbon atoms; and (D) up to 1 percent of a copolymerizable polyethylenically unsaturated cross-linking monomer, said percentages being by weight, based on the total weight of said monomers.

The copolymers are prepared by conventional emulsion polymerization methods at low pH, e.g. pH 2.5–5, yielding a high solids, low viscosity copolymer dispersion which thickens substantially upon neutralization of at least some of the remaining carboxyl groups. The copolymers are useful in a variety of applications, particularly as thickeners for aqueous systems. As liquid emulsion copolymers, they can readily be added at any point in the mixing process. Alternatively, the copolymers can be dried by any one of several well known methods, either as pure polymers, or onto a solid substrate such a kaolin clay.

DETAILED DESCRIPTION OF THE INVENTION

MONOMERIC COMPONENTS

As noted previously the copolymers of this invention are prepared by emulsion copolymerization of three essential types of monomers, namely (A) a nonionic urethane monomer obtained by condensing a nonionic polyhydric alcohol or amine-based surfactant with an ethylenically unsaturated monoisocyanate, (B) an $\alpha,\beta$-ethylenically unsaturated carboxylic acid monomer, (C) a nonionic $\alpha,\beta$-ethylenically unsaturated monomer, and (D) optionally a polyethyenically unsaturated cross-linking monomer. The proportions of the monomers can be varied widely within certain specific ranges to obtain thickening agents possessing a variety of rheological properties. As prepared, the aqueous acidic copolymer dispersions are easily handled high solids latexes which upon neutralization of at least a portion of the carboxyl groups, swell and thicken aqueous systems. The nonionic urethane monomer serves as a major constituent of the copolymer backbone, and depending upon the amount thereof present permits modification of the film forming characteristics of the copolymers when dried. The bound urethane surfactant monomer permits adjustment of the rheological properties provided by the copolymer, decreases the electrolyte sensitivity and enhances the thickening action of the copolymers.

(A) The nonionic urethane surfactant monomer.

According to preferred embodiments, the copolymers of this invention comprise about 1 to about 25 weight percent, based on total weight of monomers, of a polyhydric alcohol or amine-substituted carbonyl amino alkyl acrylate of the formula:

$$R-(CH_2CH_2O)_x(CH_2-CHO)_y-\overset{O}{\underset{|}{C}}-NH-A-O-\overset{O}{C}-Z$$
$$\phantom{R-(CH_2CH_2O)_x(CH_2-}CH_3$$

in which A is an alkylene group of the formula $(CH_2)_n$ where n is an integer of from 2 to 20; Z is $CH_2=CH-$, $CH_2=C(CH_3)-$, $CH_2=C(CL)-$, $CH_3CH=CH-$, or $$\overset{H}{\underset{|}{CH_2}}=\overset{O}{\underset{\|}{C}}-C-O-CH_2-CH_2-;$$

x is an integer of from 1 to 150 and y is an integer of from 0 to 40 when R is a sorbitan fatty ester of the formula

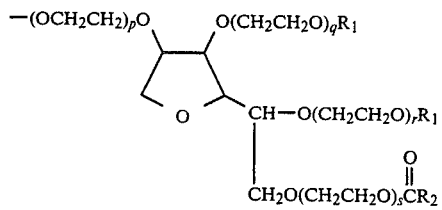

where each of p, q, r and s is an integer and the sum of said integers is from 0 to 40, $R_1$ is H or $-COR_2$, and $R_2$ is alkyl, alkylphenyl, or dialkylphenyl having 5 to 30 carbon atoms; or x and y are each integers of from 0 to 40 when R is $-NH(CH_2)_3O-R_3$, or

where $R_2$ is H or $R_3$, and $R_3$ is alkyl, alkylphenyl, or dialkylphenyl of from 5 to 30 carbon atoms;

The novel copolymerizable nonionic surfactant monomers of this invention are prepared by the conventional condensation reaction of an isocyanate with an active hydrogen compound (see High Polymers XVI Part 1, pp. 71-74). The isocyanate compound can be prepared using the method of U.S. Pat. No. 2,718,516 in which an amino alcohol is first reacted with an alkyl chloroformate to produce a compound of the formula $$HO-A-NHCOOC_2H_5$$

where A is an alkyl group. This compound is then reacted with an acid halide of the formula $$Z-CO-X$$

where X is a vinyl group such as $CH_2=CH-$ and X is halogen, such as chlorine, to form the desired isocyanate. There is also commercially available isocyanatoethyl methacrylate manufactured by The Dow Chemical Company. Another commercially available monoethylenically unsaturated monoisocyanate useful in preparing the surfactant monomer (A) is alpha, alpha-dimethyl-m-isopropenyl benzyl isocyanate (m-TMI, a product of American Cyanamid Corp.).

In the preferred surfactant monomers A is an alkylene group containing from 2 to 4 carbon atoms, x is an integer of from 2 to 20 and y is zero, and Z is either $CH_2=CH-$ or $CH_2=C(CH_3)-$.

Examples of nonionic surfactants which can be reacted with the monoethylenically unsaturated monoisocyanates to produce the novel nonionic surfactant monomers of the invention are the sorbitan fatty acid esters, such as sorbitan monooleate and sorbitan monostearate, and the polyoxyethylene sorbitan fatty acid esters, such as poly(oxyethylene)$_{20}$ sorbitan monolaurate and poly(oxyethylene)$_{20}$ sorbitan monostearate. Suitable amine surfactants include such primary amines as octyl amine and dodecyl amine, and such secondary amines as dipentyl and diheptyl amine. These reactants for the most part are commercially available. Moisture should be removed before use thereof since water interferes with the isocyanate reaction. By employing a suitable stannous catalyst, the condensation reaction is carried out at relatively low temperature, e.g. 40° C. to 60° C. and essentially quantitative yields are obtained. No by-products are formed, and thus purification of the product is unnecessary. This feature of the reaction is important in determining and controlling the amount of bound surfactant monomer present in the emulsion copolymer, whereby copolymer reproducability is readily accomplished.

Preferably the surfactant monomer comprises from about 5 to 15 percent by weight of the copolymer, 7 to 10 percent being a particularly preferred quantity for such monomer.

(B) The copolymerizable $\alpha,\beta$-ethylenically unsaturated carboxylic acid monomer.

The copolymerizable $\alpha,\beta$-ethylenically unsaturated carboxylic acid monomers have the general formula

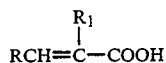

where R is H and $R_1$ is H, an alkyl group containing from 1 to 4 carbon atoms, or —$CH_2COOX$; R is —COOX and $R_1$ is H, and X is H or an alkyl group containing from 1 to 4 carbon atoms, Examples of these acid monomers include such monobasic acids as acrylic, methacrylic, crotonic, and acyloxypropionic acid. Dibasic acid monomers include maleic, fumaric, and itaconic acid, and they can be used in place of a portion, e.g. up to about 10 weight percent, of the monobasic acid. Monomers which are monoesters of dibasic acids, such as the monobutyl ester of maleic acid can also be used to advantage. The weight percent of carboxylic acid monomer is preferably between 5 and 70 percent, based on the total weight of monomers present. More preferably between 30 to 50 weight percent of the acid monomer is present. The most preferred weight percentage of the carboxylic acid monomer is between 35 and 45 percent. Acrylic and methacrylic acid are preferred acid monomers.

(C) Nonionic $\alpha,\beta$-ethylenically unsaturated monomers.

In the copolymers of this invention a monomer which serves as a major component of the backbone is a nonionic copoymerizable $\alpha,\beta$-ethyenically unsaturated monomer of the formula:

$$CH_2=CYZ$$

where Y is H and Z is CN, CL, —COOR, —$C_6H_4R$,

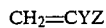

or —CH=$CH_2$; Y and Z are CL, and Y is $CH_3$ and Z is CN,

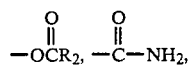

—CH=$CH_2$, —$C_6H_4R$, or —$COOR_1$, and R is H, CL, Br or alkyl containing from 1 to 4 carbon atoms; $R_1$ is alkyl containing from 1 to 12 carbon atoms, or hydroxyalkyl containing from 2 to 8 carbon atoms, and $R_2$ is alkyl containing from 1 to 8 carbon atoms.

Examples of these nonionic monomers are the $C_1$–$C_8$ alkyl and $C_2$–$C_8$ hydroxyalkyl esters of acrylic and methacrylic acids such as methyl acrylate, ethyl acrylate, butyl acrylate, 2-ethyl hexyl acrylate, methyl methacrylate, ethyl methacrylate, butyl methacrylate, 2-hydroxybutyl acrylate, 2-hydroxyethyl methacrylate, 2-hydroxypropyl methacrylate, styrene, butadiene, isoprene, vinyl chloride, vinylidene chloride, acrylonitrile, methacrylonitrile, vinyl acetate, vinyl butyrate, vinyl caprolate, p-chloro styrene, isopropyl styrene, vinyl toluene and the like. The preferred monomers are acrylate and methacrylate esters alone or mixtures thereof with styrene, acrylonitrile, or vinyl acetate.

The nonionic monomer generally comprises from about 10 to about 90 percent by weight of the copolymer. The preferred proportion of this monomer is 30–70 weight percent, while the most preferred range is about 50–60 weight percent.

(D) The optional polyethylenically unsaturated cross-linking monomer.

A small amount of a polyethylenically unsaturated monomer may be added as a cross-linking agent. Such monomers include diallyl phthalate, vinyl crotonate, allyl methacrylate, divinyl benzene, $NN^1$-methylene-bis-acrylamide, ethylene glycol diacrylate, ethylene glycol dimethacrylate, 1,6-hexanediol diacrylate, and the like. Preferably from about 0.05 to 1 weight percent, based on total monomers, of the polyethylenically unsaturated monomer is incorporated into the copolymer.

The Copolymerization Reaction

The copolymers of this invention are readily prepared by conventional emulsion polymerization techniques using the monomers described above. The polymerization can be carried out in continuous, semi-continuous or batch fashion. The polymerization reaction can be initiated at 40°–90° C., preferably 75°–85° C., with the usual thermal decomposition initiators such as ammonium persulfate or potassium persulfate or at lower temperatures using redox initiators such as t-butyl hydroperoxide/bisulfite, or hydrogen peroxide with a ferrous compound. Alternatively azo initiators such as azobisisovaleronitrile can be used.

An anionic emulsifier is normally included in the reaction medium at a concentration of about 1 to 3 percent to maintain the copolymer product in the form of a stable aqueous dispersion. Suitable emulsifiers for such purpose are sodium lauryl sulfate, sodium dodecylbenzene sulfonate, as well as other ammonium, and alkali metal alkyl aryl sulfonates, ammonium and alkali metal alkyl sulfates, sodium dioctyl sulfosuccinate, and sulfonated alkyl esters and amides. Optionally, a nonionic surfactant, such as nonylphenol ethoxylates, octylphenol ethoxylates and linear or branched alkyl ethoxylates also may be employed if desired as they have a marked effect on the properties of the copolymer product.

The polymerization is carried out at a pH below about 5.0, generally in the range of 2.5 to 5, to maintain the insolubility of the copolymer in the continuous water phase by reason of the presence of free carboxyl groups. The finished copolymer dispersions have a relatively low viscosity even at a solids content of from 20–40 weight percent, or higher. Upon addition of an alkali to neutralize at least a portion of the free carboxyl groups, aqueous systems containing the copolymers markedly thicken.

The Properties of the Copolymers

The improved copolymers of this invention are in-situ thickeners prepared by emulsion copolymerization at a pH between 2.5 and 5. The polymerization product is a milky white latex-like aqueous dispersion having a solids content up to about 50 percent, generally from 20–40 percent, by weight. The viscosity of these dispersions is generally low, typically from 25–100 cps at 25° C. The dispersions, which are relatively stable, are easily blended into a variety of aqueous systems. Different dispersions according to the invention can be blended together to provide the properties desired for a specific application. The pure copolymer, in dried form, is a solid at a temperature of 25° C.

Upon addition of an alkaline material such as an alkali metal hydroxide, sodium carbonate, or other bases such as ammonium hydroxide, methylamine or diethylamine, at least some of the free carboxy groups in the polymer are neutralized, rendering the copolymer soluble in water. At a low pH, e.g. a pH below about 5.5, the polymer exists in the form of discrete, water insoluble particles, having an average particle size of about 0.1 to 5 microns. Average molecular weights of the copolymers are estimated to be between about 100,000 and 5,000,000. Preferred copolymers have an average molecular weight of from about 500,000 to 1,000,000. Copolymers having substantially higher molecular weights may be obtained when a polyethylenically unsaturated cross-linking monomer is also present.

The selection of the nonionic $\alpha,\beta$-ethylenically unsaturated monomer has a significant effect on the thickening potential of the copolymers. Other properties such as the rheology of thickened compositions are dependent on the pH of neutralization, and the glass transition temperature, which properties may also be modified by the choice of non-ionic monomer. For example, butyl acrylate can be incorporated into the copolymer backbone to lower the glass transition temperature, or "soften" the copolymer. On the other hand, incorporation of methacrylate esters into the copolymer will stiffen the copolymer backbone and thereby harden a cast film of the polymer.

The following examples, in which all parts are by weight unless otherwise indicated, are presented as a means of further describing the preparation and use of the novel copolymers of this invention, and should not be considered as limiting the scope of the invention.

EXAMPLE 1

Preparation of 3-methoxy propyl-1 amino carbonyl amino ethyl methacrylate.

A mixture of 100 grams of previously dried 1-amino-3-methoxy propane (0.660 mole) and 0.5 grams of monomethyl ether of hydroquinone (MEHQ) was charged to a 500 ml reaction flask equipped with a thermometer, mechanical stirrer, heating mantle, condenser, and drying tube. The mixture was heated to 45° C. and 0.3 grams of stannous octoate were added. To this mixture were added 100.3 grams of 2-isocyanato ethyl methacrylate (0.647 mole) via a dropping funnel over 75 minutes while maintaining the temperature of the mixture between 45°–50° C. When the addition of the isocyanate was complete, the mixture was held at 50° C. for 1 hour to ensure complete reaction of the isocyanate. The product after cooling was a yellow oil which could be used in copolymer synthesis without purification. The reaction conditions described above apply generally for synthesizing surfactant monomers by reaction between isocyanate and primary or secondary amines.

EXAMPLE 2

Preparation of the sorbitan monooleate poly (oxyethylene)$_{19}$ ethyl oxycarbonyl amino ethyl methacrylate.

A mixture of 100 grams of previously dried poly(oxyethylene)$_{20}$ sorbitan mono-oleate (0.0765 mol) and 0.25 grams of MEHQ were charged to a 500 ml reaction flask equipped with a thermometer, mechanical stirrer, heating mantle, condenser, and drying tube. The mixture was heated to 45° C., and 0.25 grams of stannous octoate and 8.89 of 2-isocyanato ethyl methacrylate (0.0573 mol) were added while holding the reaction temperature at 45° C. When the addition of isocyanate was complete the mixture was held at 45° C. for 75 minutes. The product after cooling was a yellow liquid. The reaction conditions described in this example apply to the reacton between isocyanate and both ethoxylated and non-ethoxylated sorbitan ester surfactants.

EXAMPLE 3

Preparation of sorbitan monostearate poly(oxyethylene)$_{19}$ ethyl oxycarbonyl amino ethyl methacrylate.

A mixture of 200 grams of previously dried poly(oxyethylene)$_{20}$ sorbitan monostearate (0.153 mole) and 0.5 grams of MEHQ were charged to a reactor as described in Example 1. The mixture was heated to 45° C., and 0.25 grams of stannous octoate were added. While holding the reaction temperature at 45°–50° C. 17.76 grams of 2-isocyanato ethyl methacrylate (0.114 mole) were added via a dropping funnel over 1 hour. When the additon of isocyanate was complete the mixture was held at 45° C. for 75 minutes. Upon cooling the product was a yellow liquid which could be used without purification.

In Table I, below, the surfactants reacted with 2-isocyanato ethyl methacrylate and the procedure used, as designated by the appropriate example number, are set forth:

TABLE I

| CPS* | Surfactant Reactant | Example No. |
| --- | --- | --- |
| 1 | 1-amino-3-oxomethane | 1 |
| 2 | 1-amino-3-oxo-n-octane (CAS-68511411) | 1 |
| 3 | 1-amino-3-oxo-n-tetradecane | 1 |
| 4 | Monooleyl amine | 3 |
| 5 | Sorbitan monostearate | 3 |
| 6 | Poly(oxytheylene)$_{20}$ sorbitan monolaurate | 3 |
| 7 | Poly(oxyethylene)$_{20}$ sorbitan monostearate | 3 |
| 8 | Poly(oxyethylene)$_{20}$ sorbitan monooleate | 3 |

*"CPS" stands for "copolymer surfactant monomer"

EXAMPLE 4

Preparation of a copolymer comprising heptadecylcarbonyloxy poly(oxyethylene)$_{19}$ ethyloxycarbonyl amino ethyl methacrylate, methacrylic acid and ethyl acrylate.

An aqueous monomer mixture was prepared by combining 6.14 grams of a 30% solution of sodium lauryl sulfate, 23 grams of heptadecylcarbonyloxy poly(oxyethylene)$_{19}$ sorbitan, and 264 grams of water. After the monomer was well dispersed in the water, 92.0 grams of methacrylic acid, 115.0 grams ethyl acrylate, and 0.23 grams diallyl phthalate were added and the mixture was vigorously agitated to provide a uniform white emulsion. To an all glass reaction vessel equipped with a mechanical stirrer, heating mantle, thermometer, condenser, and dropping funnel were added 200 grams of water and 6.14 grams of a 30% solution of sodium lauryl sulfate. The reactor contents were heated with agitation to 85° C. and 9.9 grams of 2.5% ammonium persulfate solution were added. Addition of the monomer pre-emulsion mixture was begun at the rate of 2.5 ml./min. After 10 minutes the monomer feed rate was increased to 8 ml./min. and 2.5 ml. shots of 0.35% ammonium persulfate were added at 5 minute intervals. After completion of the monomer addition, 19.8 grams of 0.45% ammonium persulfate solution were added and the copolymer was cooked out for 1.5 hours. The resulting emulsion copolymer was cooled and filtered through a 40 mesh screen to remove any grit. The filtrate had a 30% solids content and the pH thereof was 2.9. A 1.0% solids solution thereof raised to pH 9.0 with NaOH, provided a viscosity of 10,000 cps at 25° C. (#6 spindle at 20 RPM Brookfield LVT).

Using the above-described emulsion polymerization procedures, nine (9) different copolymer dispersions of the invention were prepared and these are identified by "LEC" (liquid emulsion copolymer) numbers in Table II, below. Also presented in this table are viscosities for aqueous systems containing the copolymers. In two of the three systems tested either sodium or calcium chloride was present, while the third merely contained water.

glycol monoethylether, ethylene glycol dimethyl ether, and the like.

Alternatively, the product of the invention can be dried by a variety of known industrially available methods. These include, but are not limited to, tray drying, spray drying, drum drying, freeze drying, and precipitation and recovery followed by tray or fluidized bed drying. Additionally, the copolymer products of this invention can be dried onto a variety of particulate substrates such as silica, kaolin, lignite, bentonite and other clays, and weighting materials normally utilized in various applications. The purpose of using such substrates is to enable delivery of dry products capable of rapid mixing and dispersion in various applications where the support material is compatable with the desired composition. In addition, the presence of a solid particulate support facilitates the drying of copolymers that form films at relatively low temperatures, frequently a limiting factor in drying process selection. The use of dried blends of this type eliminates all concern of product freeze damage and related costs to provide cold weather protection during shipping. In addition, copolymer products of various properties can be delivered to the end user in dry form with acceptable economics.

The copolymer dispersions of the invention usually can be combined in aqueous compositions designed for partular applications with predictable effects due to the

TABLE II

| | | | LIQUID EMULSION COPOLYMERS (LEC) Brookfield Viscosity (CPS at 25° C.) | | | |
|---|---|---|---|---|---|---|
| | Monomer | CPS | Copolymer Concentration | | | 3% Copolymer Concentration |
| LEC | Weight % (1) | NO. (2) | 1% (3) | 2% (3) | 3% (3) | 2% Sodium Chloride (3) |
| 1 | 55.0/40.0/5.0 | 1 | 2,000 | 3,700 | 6,500 | 3,800 |
| 2 | 55.0/40.0/5.0 | 2 | 2,100 | 6,000 | 17,000 | 9,500 |
| 3 | 50.0/40.0/10.0 | 2 | 2,000 | 14,000 | 39,500 | 17,500 |
| 4 | 55.0/40/0/5/0 | 3 | 2,000 | 20,000 | 62,500 | 26,000 |
| 5 | 50.0/40.0/10.0 | 6 | 5,000 | 30,500 | 56,500 | 22,000 |
| 6 | 45.0/40.0/15.0 | 6 | 10,000 | 54,500 | 128,000 (4) | 26,000 |
| 7 | 50.0/40.0/10.0 | 7 | 9,500 | 62,000 | 148,000 (4) | 34,400 |
| 8 | 49.0/40.0/11.0 | 8 | 6,000 | 45,000 | 120,000 (4) | 6,000 |
| 9 | 55.0/40.0/5.0 | 8 | 7,500 | 28,000 | 39,500 | 17,500 |

(1) In all examples proportions are for ethylacrylate/methacrylic acid/CPS. All copolymers include 0.1% diallylphthalate.
(2) Examples from Table I.
(3) Spindle #6 @ 10 RPM Brookfield RVT.
(4) Spindle #7 @ 10 RPM Brookfield RVT.

Description of Uses of the Copolymers

As noted previously the copolymers of this invention are prepared by conventional emulsion polymerization methods and the resulting copolymer dispersions which contain 5 to 50 percent, generally 20 to 40 percent of copolymer, are suitable as is for use in various industrial applications such as adhesives, coatings, drilling fluids, cleaners, walljoint compounds, lotions and other personal care products, highly absorbant applications, paints, wall paper adhesives, textile print pastes, textile sizings, oil recovery applications, and the like.

Freeze point depressants may be added to the latex products of this invention to provide moderate cold weather protection during shipping if desired. The list of suitable freeze point depressants is long and the members thereof are well known to trade. Among the generally suitable freeze point depressants are lower molecular weight alcohols and glycols such as methanol, ethanol, isopropanol, butanol, ethylene glycol, propylene glycol, butylene glycol, diethylene glycol, ethylene fact that the surfactant monomer may be carefully chosen and incorporated in the copolymer chain in the desired amount.

Print Pastes

The copolymer dispersions of the invention are of interest as print paste thickeners for use in, but not limited to, textile printing. For example, aqueous dispersions having a concentration of 1 percent polymer solids of several of the foregoing examples were studied in "clear" formulations resulting from neutralization with ammonium hydroxide to pH 9. The "clear" formulations were then typically treated with up to 10% of an acrylic "low crock" print binder, a representative composition of such type being offered for sale by Alco Chemical Corporation under the designation PB-1, a 45% solids acrylic emulsion polymer (CAS No. 27082-10-6) and 5% of a color concentrate of the type sold by many companies to textile mills. A typical product of the general type is offered for sale by Catawba Charlabs of North Carolina as Impriment Blue SGG, a blue paste for test purposes.

Viscosity determinations were made on the "clear" formulations and print pastes and the results are set forth in Table III, below. The "LEC" numbers which appear in this table are for copolymers of the same number identified in Table II above.

TABLE III

| LEC | Brookfield Viscosity (cps @ 25° C.) Clear Dispersion 1% Solids | 10 RPM Print Paste |
|---|---|---|
| 1 | 5,000 | 3,000 |

Any number of different color concentrates may be substituted for the blue concentrate used in these examples. Colors are selected to answer the need of stylists in the printing industry. The degree of crosslinking of the copolymer thickeners can be varied for the purpose of altering print paste rheology. The viscosities set forth in Table III can be varied by addition of a nonionic surfactant to the print paste.

Adhesive Applications

General purpose adhesives may be thickened wth copolymer dispersions of this invention to the high viscosity required for rendering the adhesives useful for various purposes such as floor tile and carpet installation. For example, there is commercially available for such purposes an adhesive having the necessary filler loading and containing a solvent-based tackifying resin, to which a styrene butadiene latex is added. A small amount of the dispersion was added to the adhesive and Brookfield viscosities were determined on the adhesive before and after addition of the latex. The results obtained are set forth in Table IV, below:

TABLE IV

| | | Brookfield Viscosity @ 5 RPM (cps @ 25° C.)* | |
|---|---|---|---|
| LEC | Wet Parts Used** | Adhesive Base | After Latex Addition |
| 1 | 0.67 | 24,000 | 21,000 |
| — | — | 15,000 | — |

*Determined with a Heliopath TC viscometer.
**30% solids, see Table II

Oil Well Drilling Fluids

Typical oil well drilling fluids were prepared using standard methods, and the fluids were subjected to the API Fluid Loss Test and Fann 35 Viscosimeter test. A comparison was made of the thickening effects of various thickeners of this invention utilizing a standard bentonite composition (Aquagel ® of N. L. Baroid, Inc.) dispersed in mud at 15 pounds per barrel (PPB). In some of the tests fresh water mud was used. In addition, muds contaminated with either sodium chloride at a concentration of 25,000 mg/l (PPM) or 2000 mg./l (PPM) of calcium chloride were also tested for thickening effect. The muds were tested for apparent viscosity at 600 RPM (A.V.), plastic viscosity in cps. (P.V.), yield point (Y.P.), lbs/100 ft.$^2$, gel strength and fluid loss (F.L.) API Filtrate (RP 13B Fluid Loss) at 0.25 PPB active copolymer addition. The results are set forth in Tables V, VI and VII, below:

TABLE V

| | Fresh Water System | | | | | | | | | |
|---|---|---|---|---|---|---|---|---|---|---|
| | Apparent Viscosity (cps)* | | | | | | 10 sec./ 10 min. | Gel | | |
| LEC | 3 | 6 | 100 | 200 | 300 | 600 | | P.V. | Y.P. | F.L. |
| 1 | 18 | 20 | 36 | 47 | 54 | 71 | 20/27 | 17 | 37 | 14.5 |
| Base | 1 | 1 | 6 | 9 | 11 | 19 | 1/4 | 8 | 3 | 17.0 |

*Fann 35 Viscometer, reading divided by two.

TABLE VI

| | 25,000 ppm Sodium Chloride System | | | | | | | | | |
|---|---|---|---|---|---|---|---|---|---|---|
| | Apparent Viscosity (cps)* | | | | | | 10 sec./ 10 min. | Gel | | |
| LEC | 3 | 6 | 100 | 200 | 300 | 600 | | P.V. | Y.P. | F.L. |
| 1 | 11 | 11 | 15 | 18 | 20 | 28 | 13/14 | 8 | 12 | 28.0 |
| Base | 10 | 13 | 17 | 19 | 22 | 26 | 15/16 | 4 | 18 | 22.0 |

*Fann 35 Viscometer, reading divided by two.

TABLE VII

| | 2000 PPM Calcium Chloride System | | | | | | | | | |
|---|---|---|---|---|---|---|---|---|---|---|
| | Apparent Viscosity (cps)* | | | | | | 10 sec./ 10 min. | Gel | | |
| LEC | 3 | 6 | 100 | 200 | 300 | 600 | | P.V. | Y.P. | F.L. |
| 1 | 8 | 10 | 11 | 16 | 19 | 21 | 9/9 | 2 | 17 | 77.0 |
| Base | 8 | 10 | 14 | 16 | 18 | 20 | 10/12 | 4 | 14 | 70.0 |

*Fann 35 Viscometer, reading divided by two.

To illustrate the above, Standard Procedure for Testing Drilling Fluids, API RP13B, Seventh Edition, 1978, is employed.

Walljoint Compound

A walljoint compound was prepared in which were included various copolymer dispersions of the invention. This compound, designed for use in gypsum board tape joints for building construction, had the formulation set forth in Table VIII.

TABLE VIII

| Walljoint Compound | |
|---|---|
| Part A | |
| Component | Parts by Weight |
| Water | 600 |
| Dispersant | 10 |
| LEC thickener of the invention | (See Table II) |
| Clay | 20 |
| Ethylene glycol | 10 |
| Defoamer | 10 |
| Latex | 89 |
| Part B | |
| Component | Weight Percent |
| Titanium dioxide | 494 |
| Mica (325 mesh) | 175 |
| Filler | 175 |

Procedure

The components of Part A were blended together to provide a smooth mixture using a low shear folding type mixer. The components of Part B were dry blended and added slowly to Part A, and mixing was continued until a smooth blend was obtained. Part of the water of Part A was withheld and added during the addition of Part B.

The resulting walljoint compounds of this invention were tested for certain physical properties and the results are tabulated in Table IX, below:

TABLE IX

| LEC* | Brookfield Viscosity (cps @ 25° C.) 2.5 RPM Spindle TE, Heliopath Viscometer | Non Leveling | Slip | Water Retention |
|---|---|---|---|---|
| 1 | 2,000,000 | Good | Good | Good |
| Blank | 600,000 | Poor | Poor | Poor |

*See Table II

Paper Coatings

Paper coatings prepared using copolymers of this invention offer an improvement over prior coatings containing thickeners, especially as regards efficiency, i.e. the amount of thickener required to increase the viscosity of the coatings to useful levels. In this regard, the overall rheology of coatings of both the low and high shear type containing thickeners of this invention were studied. The fluid retention of the coatings was compared using an "S. D. Warren" tester, and electronic water retention (EWR) in seconds was measured. The EWR values have a bearing on the overall usefulness of a particular thickener, regardless of the amount used in the coating, and provides evidence of the runability of the coating. The results of the tests are presented in Tables X and XI.

in which x is an integer of from 1 to 150 and y is an integer of from 0 to 40 when R a sorbitan fatty ester of the formula

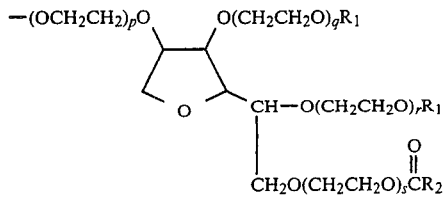

where each of p, q, r and s is an integer and the sum of said integers is from 0 to 100, $R_1$ is H or $-COR_2$ and $R_2$ is alkyl, alkylphenyl, or dialkylphenyl 5 to 30 carbon atoms; or x and y are each integers of from 0 to 40 when R is $-NH(CH_2)_3O-R_3$, or

where $R_2$ is H or $R_3$, and $R_3$ is alkyl, alkylphenyl, or dialkylphenyl of from 5 to 30 carbon atoms;

(B) about 5 to about 70 percent of a copolymerizable α,β-ethylenically unsaturated carboxylic acid monomer of the formula $$RCH=\overset{R_1}{\underset{|}{C}}-COOH$$

TABLE X

| LEC** | Thickener Parts by Weight (Dry) | Brookfield Viscosity-20 RPM (cps @ 25° C.) | Viscosity, 3000 cps @ 25° C. | | Kaltec*** High Shear Viscosity, cm. | Weight Percent Dry Polymer on 100 Parts Coating Clay |
|---|---|---|---|---|---|---|
| | | | Fluid Retention EWR, Sec. | | | |
| | | | 30#/ream | #5 Whatman | | |
| | | Paper Coating Formulation* | | | | |
| 1 | 0.2 | 1100 | 23 | 54 | 5.1 | 0.55 |
| | 0.4 | 2300 | | | | |
| | 0.6 | 4000 | | | | |
| | 0.8 | — | | | | |
| Control | (no thickener) | 100 | 6 | 22 | NR | — |
| | | Paper Coating Formulation+ | | | | |
| 1 | 0.2 | 100 | 28 | 63 | 8.9 | 1.1 |
| | 0.4 | 500 | | | | |
| | 0.6 | 1000 | | | | |
| | 0.8 | 2100 | | | | |
| Control | (no thickener) | 100 | 6 | 22 | NR | — |

*Dow 620 butadiene-stryene latex 15.0 dry parts, number one coating clay 100 parts solids, 50% coating solids, pH 9.0 by addition of ammonium hydroxide.
+National Starch Company polyvinyl acetate latex No. 1105 15.0 dry parts, number one coating clay 100 solid parts, 50% solid coating, pH 9.0 by addition of ammonium hydroxide.
**See Table II
***"E" Bob, 4400 rpm; 200,000 spring set.

I claim:
1. A copolymer obtained by aqueous emulsion copolymerization of a monomer system comprising
(A) about 1 to about 25 percent of at least one nonionic urethane monomer which is the urethane reaction product of a monoethylenically unsaturated monoisocyanate with a nonionic surfactant of the formula:

$$R-(CH_2CH_2O)_x(CH_2-\underset{\underset{CH_3}{|}}{CHO})_yH$$

where R is H and $R_1$ is H, an alkyl group containing from 1 to 4 carbon atoms, or $-CH_2COOX$; R is $-COOX$ and $R_1$ is H, and X is H or an alkyl group containing from 1 to 4 carbon atoms, (C) about 10 to to about 90 percent of at least one nonionic, copolymerizable α,β-ethylenically unsaturated monomer of the formula $CH_2=CYZ$ where Y is H and Z is CN, Cl, $-COOR$, $C_6H_4R$,

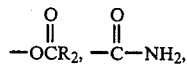

or —CH=CH$_2$; Y and Z are Cl, and Y is CH$_3$ and Z is CN,

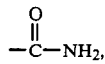

—CH=CH$_2$, —C$_6$H$_4$R, or —COOR$_1$, and R is H, Cl, Br or alkyl containing from 1 to 4 carbon atoms; R$_1$ is alkyl containing from 1 to 12 carbon atoms, or hydroxyalkyl containing from 2 to 8 carbon atoms, and R$_2$ is alkyl containing from 1 to 8 carbon atoms; and (D) up to 1 percent of a copolymerizable polyethylenically unsaturated cross-linking monomer, said percentages being by weight, based on the total weight of said monomers.

2. An emulsion copolymer according to claim 1 polymerized from a monomer system comprising (A) about 5 to about 15 percent of said nonionic urethane monomer, (B) about 30 to about 50 percent of said α,β-ethylenically unsaturated monomer in which R is H, and R$_1$ is H or an alkyl group containing from 1 to 4 carbon atoms, and (C) about 30 to about 70 percent of said α,β-ethylenically unsaturated monomer in which Y is H and Z is —COOR where R is alkyl containing from 1 to 4 carbon atoms.

3. An emulsion copolymer according to claim 2 in which in said nonionic urethane monomer (A), R is a sorbitan monoester in which R$_1$ is an alkyl group containing from 10 to 20 carbon atoms and the sum of p, q, r and s is 10 to 20, and x and y are zero.

4. An emulsion coplymer according to claim 3 in which in said nonionic urethane monomer (A), R is sorbitan trioleate, and the sum of p, q, r and s is zero.

5. An emulsion copolymer according to claim 2 in which in said nonionic urethane monomer (A), R is —N(R$_3$)$_2$ where R$_3$ is an alkyl group containing from 5 to 15 carbon atoms, x is an integer of from 2 to 20 and y is zero.

6. A copolymer obtained by aqueous emulsion copolymerization of a monomer system comprising (A) about 1 to about 25 percent of at least one substituted carbonyl amino alkyl acrylate monomer of the formula:

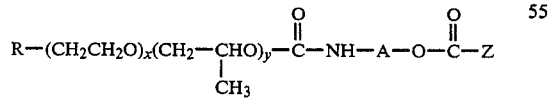

in which A is an alkylene group of the formula (CH$_2$)$_n$ where n is an integer of from 2 to 20; Z is CH$_2$=CH—, CH$_2$=C(CH$_3$)—, CH$_2$=C(Cl)—, CH$_3$CH=CH—, or

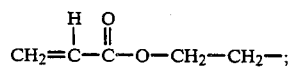

x is an integer of from 1 to 150 and y is an integer of from 0 to 40 when R a sorbitan fatty ester of the formula

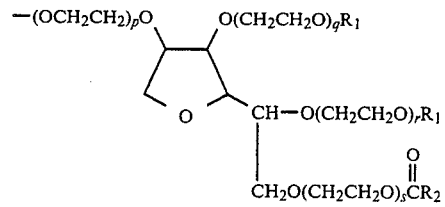

where each of p, q, r and s is an integer and the sum of said integers is from 0 to 100, R$_1$ is H or —COR$_2$ and R$_2$ is alkyl, alkylphenyl, or dialkylphenyl having 5 to 30 carbon atoms; or x and y are each integers of from 0 to 40 when R is —NH(CH$_2$)$_3$O—R$_3$, or

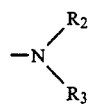

where R$_2$ is H or R$_3$, and R$_3$ is alkyl, alkylphenyl, or dialkylphenyl of from 5 to 30 carbon atoms;

(B) about 5 to about 70 percent of a copolymerizable α,β-ethylenically unsaturated carboxylic acid monomer of the formula

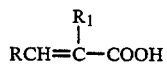

where R is H and R$_1$ is H, an alkyl group containing from 1 to 4 carbon atoms, or —CH$_2$COOX; R is —COOX and R$_1$ is H, and X is H or an alkyy group containing from 1 to 4 carbon atoms, (C) about 10 to about 90 percent of at least one nonionic, copolymerizable α,β-ethylenically unsaturated monomer of the formula

CH$_2$=CYZ where Y is H and Z is CN, Cl, —COOR, —C$_6$H$_4$R,

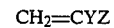

or —CH=CH$_2$; Y and Z are Cl, and Y is CH$_3$ and Z is CN,

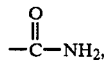

—CH=CH$_2$, —C$_6$H$_4$R, or —COOR$_1$, and R is H, Cl, Br or alkyl containing from 1 to 4 carbon atoms; R$_1$ is alkyl containing from 1 to 12 carbon atoms, or hydroxyalkyl containing from 2 to 8 carbon atoms, and R$_2$ is alkyl containing from 1 to 8 carbon atoms; and (D) up to 1 percent of a copolymerizable polyethylenically unsaturated cross-linking monomer, said percentages being by weight, based on the total weight of said monomers.

7. An emulsion copolymer according to claim 6 polymerized from a monomer system comprising
- (A) about 5 to about 15 percent of said substituted carbonyl amino alkyl acrylate monomer,
- (B) about 30 to about 50 percent of said $\alpha,\beta$-ethylenically unsaturated monomer in which R is H, and $R_1$ is H or an alkyl group containing from 1 to 4 carbon atoms, and
- (C) about 30 to about 70 percent of said $\alpha,\beta$-ethylenically unsaturated monomer in which Y is H and Z is —COOR where R is alkyl containing from 1 to 4 carbon atoms.

8. An emulsion copolymer according to claim 7 in which in said substituted carbonyl amino alkyl acrylate monomer (A), R is a sorbitan monoester in which $R_1$ is an alkyl group containing from 10 to 20 carbon atoms and the sum of p, q, r and s is 10 to 20, Z is $CH_2$=CH— or $CH_2$=($CH_3$), A is alkylene containing from 2 to 4 carbon atoms, and x and y are zero.

9. An emulsion copolymer according to claim 8 in which in said substituted carbonyl amine alkyl acrylate monomer (A), R is sorbitan trioleate, and the sum of p, q, r and s is zero.

10. An emulsion copolymer according to claim 7 in which in said substituted carbonyl amino alkyl acrylate monomer (A), R is —$N(R_3)_2$ where $R_3$ is an alkyl group containing from 5 to 15 carbon atoms, Z is $CH_2$=CH or $CH_2$=C($CH_3$)—, A is alkylene containing from 2 to 4 carbon atoms, x is an integer of from 2 to 20 and y is zero.

11. An emulsion copolymer according to claim 6 polymerized from a monomer system comprising
- (A) about 7 to about 10 percent of said substituted carbonyl amino alkyl acrylate monomer in which Z is $CH_2$=C($CH_3$)—, A is ethylene, x is an integer from 2 to 20 and y is zero,
- (B) about 35 to about 45 percent of acrylic or methacrylic acid,
- (C) about 50 to about 60 percent of ethyl acrylate and
- (D) about 0.5 to about 1 percent of said polyethylenically unsaturated cross-linking monomer.

12. An emulsion copolymer according to claim 11 polymerized from a monomer system comprising:
- (A) a substituted carbonyl amino ethyl methacrylate selected from the group consisting of poly(oxyethylene)$_{20}$ sorbitan monooleate, and monooleyl amine-carbonyl amino ethyl methacrylate,
- (B) methacrylic acid,
- (C) ethyl acrylate, and
- (D) diallylphthalate.

13. An aqueous colloidal dispersion comprising from about 5 to about 50 percent, by weight, of an emulsion copolymer of claim 6 having a pH of from about 2.5 to about 5.

14. An aqueous colloidal dispersion comprising from about 5 to about 50 percent, by weight, of an emulsion copolymer of claim 12 having a pH of from about 2.5 to about 5.

15. A process for making the aqueous colloidal dispersion of claim 13 comprising emulsion polymerizing the monomeric system thereof at a pH of from about 2.5 to about 5 in the presence of a free radical producing initiator at a temperature of from about 40° to about 90° C.

16. A process for making the aqueous colloidal dispersion of claim 14 comprising emulsion polymerizing the monomeric system thereof at a pH of from about 2.5 to about 5 in the presence of a free radical producing initiator at a temperature of from about 75° to about 85° C.

17. A thickened aqueous composition containing an effective thickening amount of at least a partially neutralized emulsion copolymer of claim 6.

18. A process for making a thickened aqueous composition which comprises combining with the aqueous composition an effective thickening amount of an emulsion copolymer of claim 6 and at least partially neutralizing said copolymer to thus thicken said composition.

19. A thickened composition according to claim 17 comprising a latex paint.

20. A thickened composition according to claim 17 comprising a pigment dispersion.

21. A thickened composition according to claim 17 comprising an oil well drilling fluid.

22. A thickened composition according to claim 17 comprising a textile printing paste.

23. A thickened composition according to claim 17 comprising an adhesive.

24. A thickened composition according to claim 17 comprising a liquid detergent.

25. A thickened composition according to claim 17 comprising a paper coating composition.

26. A thickened composition according to claim 17 comprising a wall joint compound.

* * * * *

UNITED STATES PATENT AND TRADEMARK OFFICE
CERTIFICATE OF CORRECTION

PATENT NO. : 4,600,761
DATED : July 15, 1986
INVENTOR(S) : Charles G. Ruffner and John M. Wilkerson, III It is certified that error appears in the above-identified patent and that said Letters Patent are hereby corrected as shown below:

Column 10, Table I, the Surfactant Reactants for each of CPS 1, 2 and 3 should read, respectively:

--1-aminopropyl-3-oxomethane--

--1-aminopropyl-3-oxy-n-octane--

--1-aminopropyl-3-oxy-n-tetradecane (CAS-68511411)--

Signed and Sealed this

Twenty-eighth Day of October, 1986

[SEAL]

Attest:

DONALD J. QUIGG

*Attesting Officer*  *Commissioner of Patents and Trademarks*

UNITED STATES PATENT AND TRADEMARK OFFICE
CERTIFICATE OF CORRECTION

PATENT NO. : 4,600,761
DATED : July 15, 1986
INVENTOR(S) : Charles G. Ruffner and John M. Wilkerson, III It is certified that error appears in the above-identified patent and that said Letters Patent are hereby corrected as shown below:

Column 4, line 43 "CL" should read --Cl--;

line 48 "CL" should read --Cl--;

line 56 "CL" should read --Cl--;

Column 5, line 59 "(CL)" should read (Cl)--.

Column 7, line 49 "CL" should read --Cl--;

line 54 "CL" should read --Cl--;

line 61 "CL" should read --Cl--.

Column 15, line 33, delete "and XI".

Signed and Sealed this

Thirty-first Day of March, 1987

Attest:

DONALD J. QUIGG

Attesting Officer

Commissioner of Patents and Trademarks